United States Patent [19]

Witt

[11] Patent Number: 4,714,581

[45] Date of Patent: Dec. 22, 1987

[54] METHOD FORMING THREE DIMENSIONAL SIGN DISPLAY CHARACTER

[75] Inventor: Frank A. Witt, Lexington, S.C.

[73] Assignee: Colite Industries, Inc., West Columbia, S.C.

[21] Appl. No.: 883,857

[22] Filed: Jul. 10, 1986

Related U.S. Application Data

[60] Continuation of Ser. No. 141,144, Aug. 17, 1980, abandoned, which is a division of Ser. No. 956,101, Oct. 30, 1978, Pat. No. 4,202,123, which is a continuation of Ser. No. 700,218, Jun. 28, 1976, Pat. No. 4,122,616.

[51] Int. Cl.[4] ...................... B29C 51/10; B29C 39/10; B29C 67/18; B29C 67/22

[52] U.S. Cl. ...................................... 264/553; 40/596; 40/616; 264/46.5; 264/46.6; 264/46.8; 264/250; 264/255; 264/267

[58] Field of Search ...................... 264/553, 46.5, 46.6, 264/46.8, 250, 255, 267; 40/596, 616

[56] References Cited

U.S. PATENT DOCUMENTS

| | | | |
|---|---|---|---|
| 1,316,756 | 9/1919 | Andresen | 40/596 |
| 2,376,653 | 5/1945 | Boyer | 264/46.5 X |
| 2,501,084 | 3/1950 | Ownbey | 40/616 |
| 2,778,134 | 1/1957 | Willy . | |
| 3,013,922 | 12/1961 | Fisher | 264/46.5 |
| 3,061,881 | 11/1962 | Sherno | 40/596 X |
| 3,091,946 | 6/1963 | Kesling | 264/46.8 X |
| 3,137,744 | 6/1964 | Burrus | 264/46.5 |
| 3,177,271 | 4/1965 | Slayman | 264/46.5 |
| 3,209,056 | 9/1965 | Jacobs | 264/46.5 X |
| 3,288,896 | 11/1966 | Hendricks | 264/46.5 |
| 3,328,496 | 6/1967 | Graves | 264/46.5 |
| 3,402,520 | 9/1968 | Lee et al. | 264/46.5 X |
| 3,532,779 | 10/1970 | Wienand | 264/257 X |
| 3,566,525 | 3/1971 | Nassil et al. . | |
| 3,582,388 | 6/1971 | Stayner | 427/204 X |
| 3,608,007 | 9/1971 | Hendrickson | 264/46.5 X |
| 3,636,151 | 1/1972 | Nagai | 264/46.8 X |
| 3,703,572 | 11/1972 | Bellasalma | 264/46.8 X |
| 3,708,563 | 1/1973 | Sells | 264/46.6 X |
| 3,711,581 | 1/1973 | Fowler, Jr. et al. | 264/46.5 |
| 3,717,922 | 2/1973 | Witkowski | 264/46.8 X |
| 3,751,319 | 8/1973 | Green et al. . | |
| 3,868,209 | 2/1975 | Howell | 264/553 X |
| 3,971,687 | 7/1976 | Greer et al. | 264/553 X |
| 4,061,272 | 12/1977 | Winston | 264/46.6 X |
| 4,122,616 | 10/1978 | Witt | 40/596 |
| 4,134,942 | 1/1979 | Mirr et al. | 264/46.8 X |
| 4,165,357 | 8/1979 | Vetter | 264/553 X |
| 4,176,154 | 11/1979 | Miki et al. | 264/553 X |
| 4,202,123 | 5/1980 | Witt | 40/596 |
| 4,331,628 | 5/1982 | Ziegler | 264/553 |
| 4,427,476 | 1/1984 | Beck et al. | 264/553 X |

FOREIGN PATENT DOCUMENTS

| | | | |
|---|---|---|---|
| 654094 | 12/1937 | Fed. Rep. of Germany | 40/616 |
| 2410322 | 7/1979 | France | 40/616 |
| 524180 | 5/1955 | Italy | 40/616 |
| 40-14579 | 7/1965 | Japan | 264/46.5 |
| 453058 | 3/1968 | Switzerland | 40/596 |

*Primary Examiner*—Philip Anderson

*Attorney, Agent, or Firm*—Allegretti, Newitt, Witcoff & McAndrews, Ltd.

[57] ABSTRACT

A relatively thin thermoplastic sheet material, vacuum molded to form a sign letter base including hollow wall members and hollow light-fixture supports upstanding from a single-thickness horizontal bottom member. The base inverted forms a mold itself for receiving a flexible plastic foam inserted to a suitable height and disposed within the vertical walls and fixture supports for providing compressible elasticity to the thin molded sheet in predetermined locations for enabling cooperative interaction of the same with retainer members used to secure a display sign face and gas filled lighting tube structures in proper location onto the base. A rigid polyester resin is cast as a ring encircling the letter walls, located and supported by the flexible foam to stabilize and support the thin nature of the base.

Rotatable tube positioning platforms journaled in frictional interference to the light fixture supports, receive upstanding display-tube grippers adjustably positioned above the platforms by a collinear array of break-off spheroids integrally shouldered one from the other. The grippers expansively displace by action of tube-forced insertion to recoil around the tube in holding engagement aided by a plurality of resilient tine sectors deflecting longitudinally of the tube to buoy the same in light resilient interference.

2 Claims, 10 Drawing Figures

METHOD FORMING THREE DIMENSIONAL SIGN DISPLAY CHARACTER

This application is a continuation of application Ser. No. 141,144, filed Aug. 17, 1980, now abandoned, which is a division of Ser. No. 956,101 filed Oct. 30, 1978, and now U.S. Pat. No. 4,202,123, which in turn is a continuation of Ser. No. 700,218 filed June 28, 1976 and now U.S. Pat. No. 4,122,616.

BACKGROUND OF THE INVENTION

1. Field of the Invention

The invention relates to sign character elements used for advertising and like display and more particularly to a method and apparatus for forming a relatively light-weight, inexpensive, quickly manufacturable sign letter. More particularly, the invention has relation to quick mounting securement and adjustability of positioning of gas filled lighting tubes within the letter, and retainment of a translucent sign face cover thereon.

2. Description of the Prior Art

Heretofore, sign display letters have been formed from a plurality of aluminum side walls individually cut to shape the outline of a desired letter or symbol, then welded together for forming a unitary side wall structure. Brackets are spot welded to the interior of the letter and are adapted to receive an aluminum base plate by screw securement with numerous screws positioned around the irregularly shaped base panel. Tube support components are screw secured or spot welded to the base plate for upstanding therefrom to spatially position neon gas filled tubes within the letter. Neon tubing is next placed onto the supports and secured thereto by handwrapping wire or other securing expedients. And finally, the sign face is secured to the structure by screw brackets or other securement devices, for covering the neon tubing.

Such prior art signs have a high manufacturing cost due to the time consuming labor involved in assembling the same. For example, the side walls must be cut to proper sizes, then jigged together for welding into position. Component parts must have screw holes set in proper alignment and then screw tightened. Neon tubing must be carefully positioned within the letter, then secured to a plurality of tube supporting devices at individual locations. A sign face panel must then be screw fastened into position covering the structure.

Even though aluminum and other lightweight metals are incorporated in the construction of sign letters, the letters are very heavy ranging as high as 75 lbs. for a 2′×3′ letter. Both this complexity of construction and large weight factor exacerbate attempts at mass production of sign letters.

While plastics have been utilized in the construction of sign letters, they have generally taken the form of stainless steel imbedded within plastics, and the like, in order to maintain necessary sturdiness, but generally the letters have the same heaviness and high costs due to the time involved assembly of component parts therewithin.

Problems further arise in the spatial positioning of neon tubing within the letter bases. With tubing sometimes irregular in shape, slightly varying from one display to the next, the tube supporting devices must be positioned to accomodate for such irregularities before securement of the supports to the base. Although screw adjustable supports are known in the art, they add to the cost of manufacture due to the time consumption involved in adjusting the same. And if adjustments are not proper, a bias wrenching-type force may be adversely placed on the tubes causing breakage during an abrupt movement of the letter when shipping or the like.

It is therefore an object of the present invention to bring about a major reduction in labor costs conventionally encountered in the manufacture of display sign characters.

It is a further object of the present invention to promote ease of mass production of sign letters.

It is another object of the present invention to provide quick assembling features to the component parts of sign letters.

It is yet another object of the present invention to form the base structure of a sign letter from a very thin plastic sheet, approximately 0.080 inches.

It is yet another object of the present invention to utilize a vacuum molding process for construction of a sign letter base.

It is a further object of the present invention to provide an illuminous display sign superior in point of simplicity.

It is yet another object of the present invention to provide quick adjustability of spatial positioning of neon tubes and the like within a sign letter.

It is yet another object of the present invention to provide quick securement capabilities of neon-tubing within a sign letter.

It is another object of the present invention to provide a lighter weight sign letter then heretofore accomplished.

SUMMARY OF THE INVENTION

The objectives of the invention are accomplished by configuring a material substance of desired weight and moldable characteristics into a letter base, forming the letter walls having hollow portions in discrete locations for insertion of a flexible member therewithin for providing a retain-actuable operation enabling cooperative securement of a sign display face covering the base.

The invention also embraces configuring a very thin substance into a letter base, outlining the letter walls leaving the same hollow. A flexible substance is disposed within the hollow walls for providing compressible elasticity to the thin walls enabling cooperative interaction of the same with a retainer member used to secure a sign display face covering the base. A rigid substance is then disposed within the hollow walls in discrete locations for rigidifying the thin nature of the base.

Tube supporting standards upstand from the bottom of the letter base for receiving tube support platforms rotatably mounted onto the standards, having a frictional rotational interference purposed by a compressible expansibility of the standard in the area of platform rotation. Supporting stands are rotatably mounted to upstand from the platforms, having a break-off height adjustability provided thereto while still maintaining rotation and support from the platforms. Gripper members atop the stands receive display tubes by a tube-forced insertion and buoying tines associated with the gripper members are resiliently deflected in engagement with the outside surface of the inserted tubes to provide shock absorbing action and permitting different tube diameter receiving capabilities to the gripper member.

Other objects, features and advantages of the invention will be readily apparent from the following description of the preferred embodiment taken in conjunction with the appended claims and accompanying drawings.

DESCRIPTION OF THE PREFERRED EMBODIMENT

Figure 1:
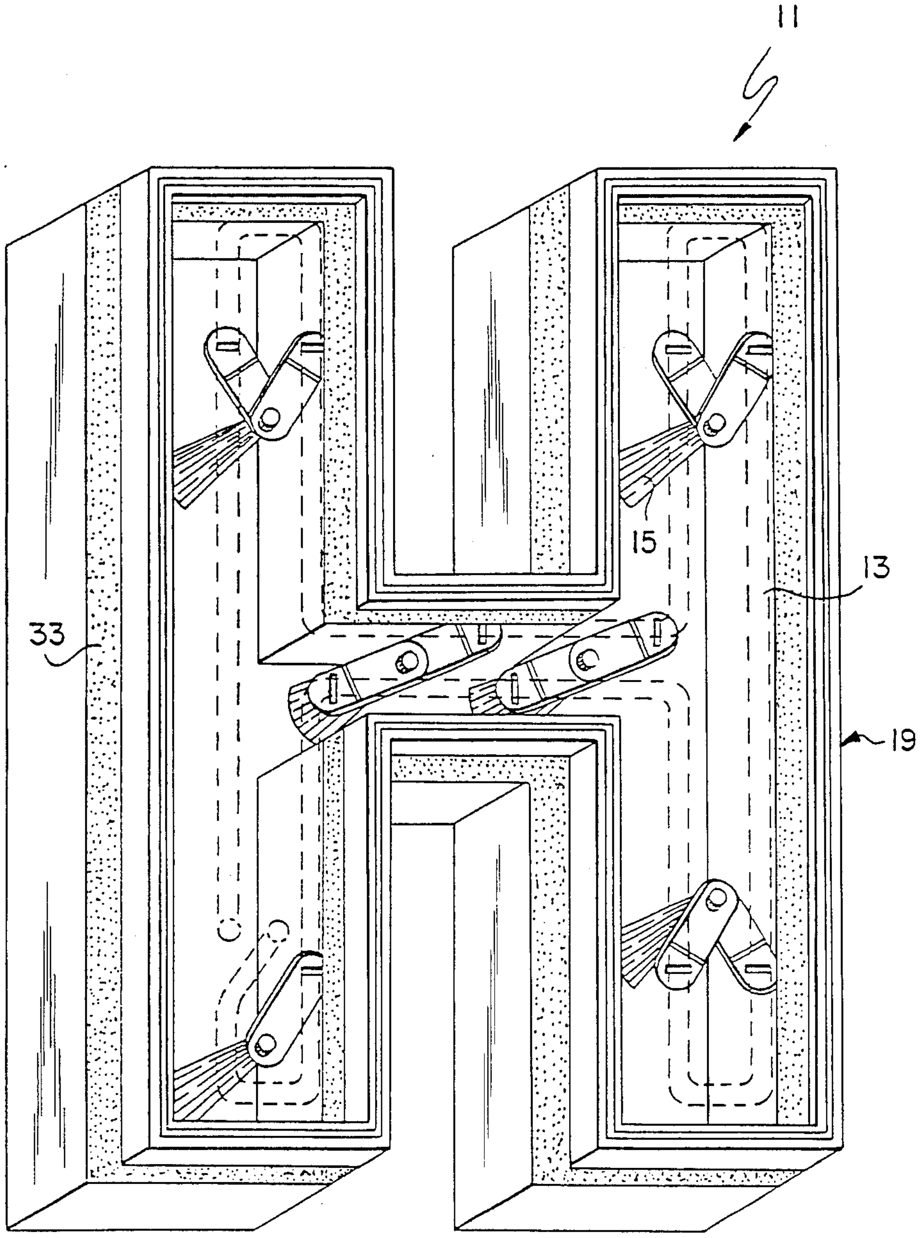
FIG. 1 is a perspective view of a block sign letter of the invention, shown embodied as the alphabetical letter "H".

A block sign letter 11 according to the present invention is illustrated in FIG. 1, shown in the shape of the alphabetical letter "H". A gas filled tube 13, or the like, is mounted within the letter 11, being supported by frustoconically shaped standards 15 rising from the bottom of the letter and enclosed by a substantially vertical wall 19 circumscribing the letter's shape.

Figure 2:
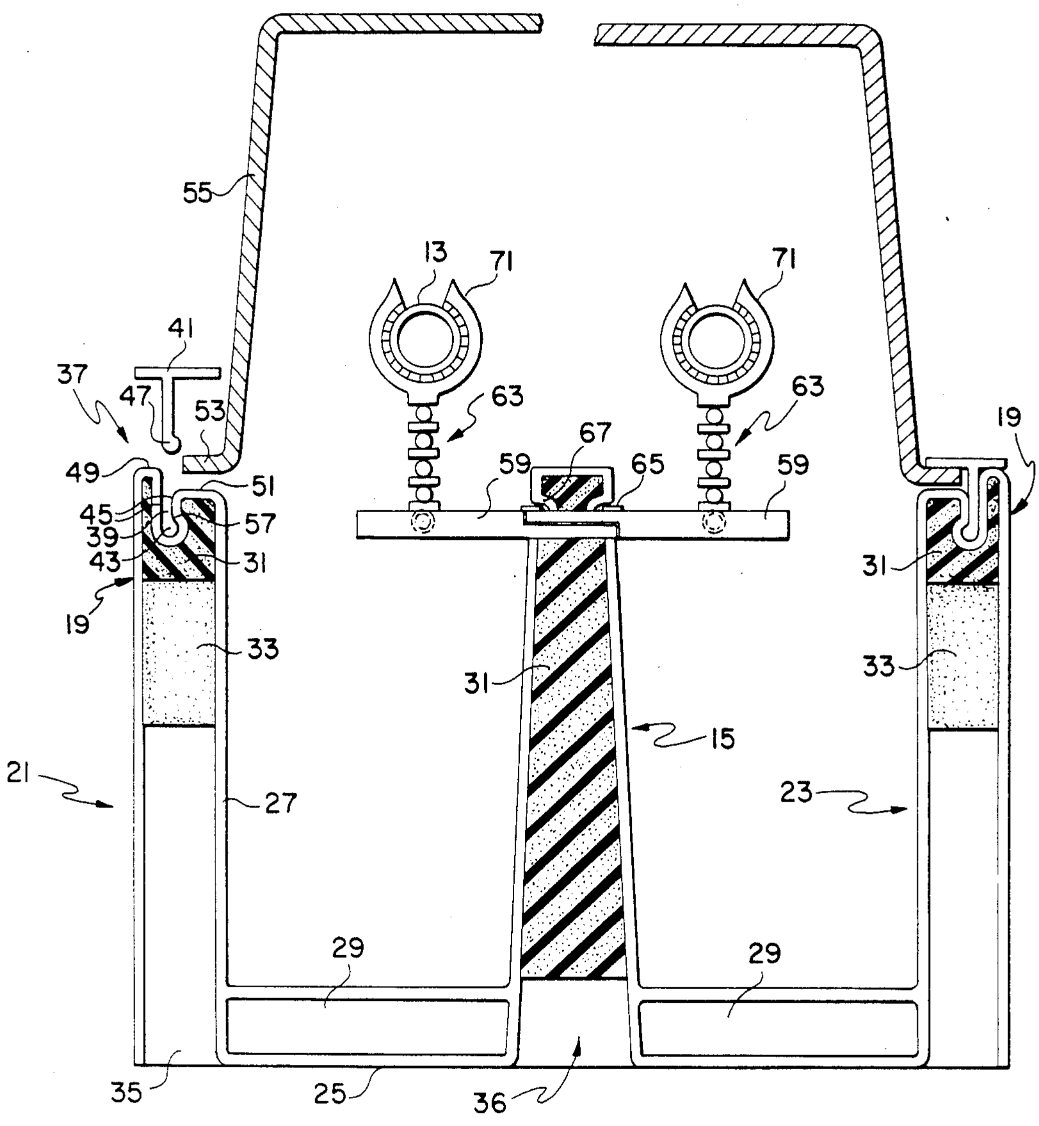
FIG. 2 is a cross sectional side view of one of the legs of the letter "H" of FIG. 1 except for support platforms 59 which are shown in full view.

FIG. 2 shows a cutaway side view of one of the legs of the letter "H" of FIG. 1. The two side wall members 21, 23 (of the vertical wall 19) spaced by a bottom member 25 are formed from a single rigid sheet 27 of a very thin material substance capable of being vacuum formed over a desired-shape mold. The sheet 27 is an ABS fire retardant film of approximately 0.080 inches in thickness, and may be as thick as 0.2 inches.

The rigid sheet is preheated to a molding temperature and upon application of a vacuum, the sheet is brought into conformity with a mold made from wood, steel, aluminum, plastic or the like. Once cooled, the molded base becomes rigid enough to be lifted from the mold.

A rather large sheet may be similarly applied to a plurality of base molds to form many bases in a single step, after which the bases are cut one from the other. The molding is a quick operation which quickly frees the molds for subsequent assembly line use for forming more base structures.

Figure 3:
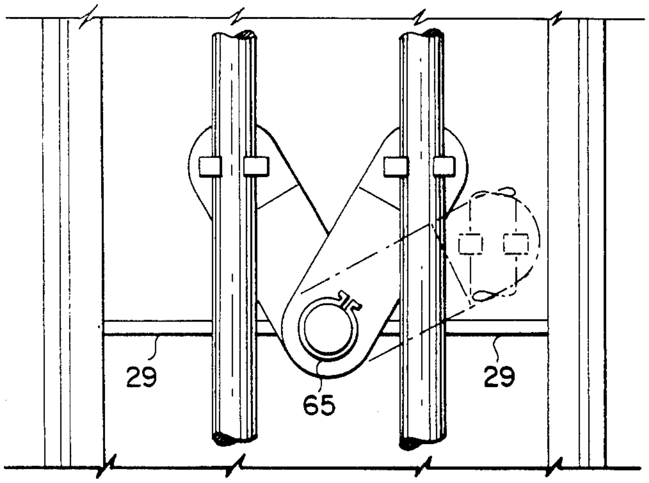
FIG. 3 is a partial top plan view of one of the legs of the letter "H" of FIG. 1.

The single sheet 27 outlines the boundaries of the wall members 21, 23 providing an outside, topside and inside face leaving a hollow interior 35. The standards 15 are also molded directly from the sheet 27 and have a hollow interior 36. Rigidizers 29, shaped of a linear channel-like protuberance, molded up from the bottom member 25 communicates the side walls 21, 23 with the standards 15 for support thereof (FIG. 3).

At this stage in the manufacture, the base component of the letter block 11 formed from the single thermoplastic sheet 27 is extremely unsteady and may break or crack with abrupt movements due to its thinness. Thus, a resin casting step is next performed to add solidarity to the thin structure.

The base structure is pulled from the mold and inverted (depending upon which side is molded down) to form a mold of itself. A flexible foam 31, e.g. a polyurethane foam, is inserted into the interior 35 of the side walls to a height of approximately one inch, where the side walls are of a height of 6 inches. The foam 31 is of such a height as to provide a proper flexibility to the sheet 27 in the area of the topside of the wall member, as will be described hereinafter. The flexible foam 31 is also inserted into the interior 36 of the standards 15 to a level just below the rigidizers 29.

A rigid polyester resin 33 is next poured into the interior 35 of the side walls to an approximate depth of 25% of the wall height, 1½ inches, supported by the flexible foam layer 31. The rigid resin 33 is cast as a ring encircling the letter walls (FIG. 1) to provide the necessary support and strength to the unsteady nature of the base structure. The rigid resin cures to a solid form integrally adhering to the flexible foam 31 and thermoplastic sheet 27.

The topside 37 of the wall member 19 is vacuum molded with a configured hollow portion or channel 39 jutting down into the interior of the wall member and shaped for receiving the end of a retainer cap 41. The channel 39 is shaped with a bulbous pocket 43 terminating two parallel channel walls 45 spaced narrower than the width of the pocket 43.

The retainer cap 41 is T-shaped in configuration having a bulbous end 47 at the base of its vertical leg. The cap 41 is pressed into the channel 39 is a relatively downward direction, bulbous end first. The bulbous end is shaped to permit camming the two side channel walls 45 apart during entry into and exit from the pocket when a sufficient amount of force is supplied to the retainer cap 41.

As previously described the flexible foam 31 is disposed within the interior of the side walls 21, 23. The foam is so positioned to surround the configured channel 39, providing the channel with the elasticity necessary for springing the side walls 45 back into position after the bulbous end enters the pocket, locking the retainer cap snugly on the topside 37 of the side wall 19.

The topside 37 of the wall member 19 is formed of two plateau surfaces 49, 51 separated by the channel 39. The inner plateau surface 51 seats a lower lip 53 of a translucent sign face 55 when the sign face is positioned onto the letter base structure.

The outer plateau surface 49 is disposed a differential height above the inner plateau surface 51 such that the outer plateau surface is at a height substantially parallel to the upper surface of the sign face lip 53 when the lip is seated on the inner plateau surface 51. This registration permits the horizontal leg of the retainer 41 to seat on the outer plateau surface 49 and upper surface of the sign face lip 53 for securely gripping the sign face lip to the inner plateau suface 51 when the retainer is locked into the side wall 19. The parallel seating of the horizontal leg of the retainer cap 41 provides a flat horizontal surface as a pleasant visual communication to the viewer of the sign letter.

The retainer 41 has been described without regard to its length along the sign face and may comprise a plurality of spaced retainer caps or a rather long retainer cap including one or several, forming a continuous horizontal strip around the base of the sign face 55.

The bulbous end 47 is shaped to give the T-shape of the retainer an almost J-shape, i.e., the bulbous end is set at the base of the vertical leg of the retainer such that one side of the vertical leg is substantially straight while its opposite side is protruded to form the bulb. The bulb is inserted into the pocket 43 such that the protrusion is directed toward the inside of the letter. Thus, the shape of the bulbous pocket 43 provided a pronounced corner 57 adjacent where the protrusion extends outward from the retainer leg and into the pocket. The corner 57 acts as a latch to prevent removal of the retainer from the channel 39 unless a force is directionally applied from outside the side wall. Thus, any wind getting under the sign face or any inadvertent jarring of the sign face which provides a force pulling the retainer up from the inside of the wall will not loosen the cap because of the pronounced corner 57 and overall configuration of the cap and wall.

Figure 4:
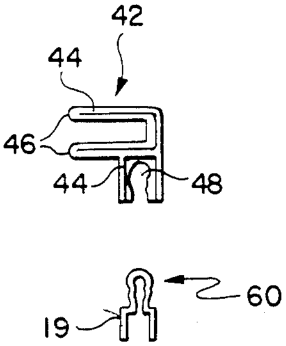
FIG. 4 is a second embodiment of a sign face retainer member of the block sign letter according to the present invention.

A second retainer embodiment is illustrated in FIG. 4 showing a plastic extrusion retainer 42 having aluminum inserts 44. The retainer 42 includes two parallel gripping jaws 46 for flexibly receiving the lower lip 53 of the sign face 55. The topside 37 of the wall member 19 is formed with a mating configuration 60 for compressing according to the flexible foam cast therewithin to mate with a formed opening 48 in the underside of the retainer 42. The walls defining the opening 48 may be of a flexible nature if so desired.

Figure 4A:
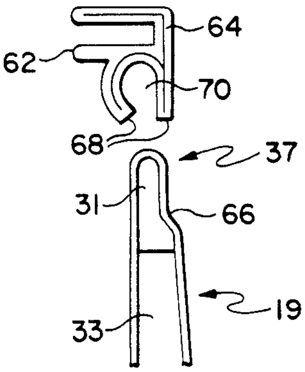
FIG. 4a is a third embodiment of a sign face retainer member of the block sign letter according to the present invention.

A third retainer embodiment similar to that of FIG. 4 is illustrated in FIG. 4*a*, showing a plastic extrusion retainer 62 having a metal insert 64, the lower portion of which is of a U-shaped configuration for coupling engagement with the topside 37 of the wall member 19. The bottom ends 68 of the U-shape of the retainer are spaced apart a distance narrower than the width of the top of the wall. The metal insert maintains its rigidity during coupling such that as the retainer is forced down onto the top of the wall member, the ends 68 act to compress the wall member along the line of contact expanding the portion of wall member above the line of contact to fill the U-shaped pocket 70. With the retainer pressed into position, the top of the wall member has expanded to form a bulb within the pocket 70, which provides interference to prevent the retainer from being lifted off the top of the wall member without a substantial force being applied thereto. The top portion of the wall member has an indentation 66 shaped in the outside of the wall for receiving the outside leg of the U-shape when the retainer is pressed into position, providing a flush interface between the retainer and the outside of the wall member to give the outside of the wall a substantially flat visual appearance.

Figure 4B:
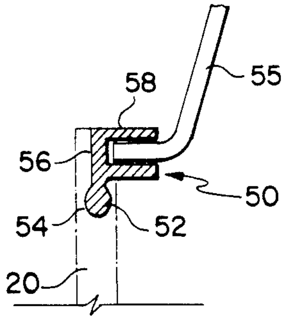
FIG. 4b is a fourth embodiment of a sign face retainer member of the block sign letter according to the present invention.

A fourth retainer embodiment similar to that of FIG. 4 is illustrated in FIG. 4*b*, showing a flexible retainer 50 having two parallel gripping jaws for receiving the sign face 55. The retainer 50 has a bulbous end 52 adapted for reception into a hollow portion 54 formed in the topside of the wall member 20. The configured hollow portion has a vertical side wall 56 for bracing the backside of the retainer 50 when the sign face 55 is mounted into position. The wall member 20 is of a two plateau configuration at its topside for mounting of the retainer 50 while providing a horizontal, visually communicating face 58 along the base of the mounted sign face 55.

Referring to FIG. 2, support platforms 59 are rotatably mounted to the frustoconical standards 15 serving as base supporting structures for neon tube-lighting stands 63. Each platform 59 is shaped as an elongated ellipse (FIG. 5) having a circular opening 61 registered concentric with one of the elliptical centers. The support platform is positioned onto a standard 15 with the opening 61 receiving the standard and coming to rest where the standard's outside surface diverges to the same circumference as that of the opening 61.

FIG. 2 illustrates two platforms secured into position onto a standard 15. As the platforms are pressed onto the conical standard the side walls are compressed, permitted by the flexible foam disposed therebehind, and a retainer ring 65 (FIG. 3) of a spring-biasing nature is snapped into a circular groove recess 67 circling the conical standard at a particular height. The groove recess 67 may be formed in the outside surface of the standard during the vacuum molding and the recess may be positioned at a height according to the degree of frictional interference desired for the rotatability of the platforms 59. Thus, as the support platforms are pressed farther down on the standards, more frictional interference will be provided to the platform's rotatability. Thus, the divergent shape of the standard 15, the size of the opening 61, the position of the recessed groove 67 and the compressibility of the flexible foam determine the amount of frictional interference provided to the platform's rotatability about the standard 15.

The frictional interference provided between a platform 59 and a standard 15 may be determined such that assembly personnel may move the platforms into proper position for receiving the neon tubes and when once positioned, slight jarring forces to the letter may not move the platforms from their position. This is particularly desirable where the light fixtures are otherwise than a unitary structure and may impact against the walls or other tubing if permitted to freely move.

Figure 6:
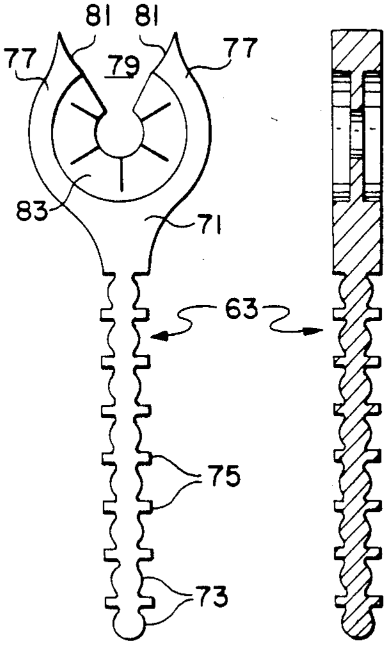
FIG. 6 is a front view and cross sectional side view of a tube support stand of the block sign letter according to the present invention.

Referring to FIGS. 2 and 6, tube stands 63 are utilized to adjustably position the neon tubing a desired distance above the platforms 59. The tube stand 63 includes a gripper member 71 secured atop a collinear array of break-off spheroids 73, with each spheroid spaced apart by a shoulder member 75. The spheroids are formed to the stand 63 to permit break-off of the spheroids one from the other to provide adjustability to the height of the stand.

An opening 69 passing through the other elliptical center of the platform 59 receives the bottom-most spheroid by a slight force pressing the same into the pocket-like opening 69. The opening 69 is designed for yielding to permit entry of the spheroid therewithin and permits the spheroid to rotate in a ball-and-socket-like fashion. The shoulder member 75 provides support for the stand seating on the upper surface of the platform when the stand is locked into the opening 69. As illustrated by the phantom lines in FIG. 3, the stand 63 may rotate within the opening 69 as the platform 59 is rotated on the standard 15.

Referring to FIG. 6, the gripper element 71 has two retaining jaws 77 disposed in a U-shaped registration permitting entrance of the neon tubing via the opening 79 at the top of the "U". Each of the jaws 77 has a camming surface 81 defining the opening 79, for cooperating with the curved surface of the neon tubing during a downward forcing of the same between the two jaws 77 for biasing the jaws apart for receiving of the tubing therebetween.

Figure 7:
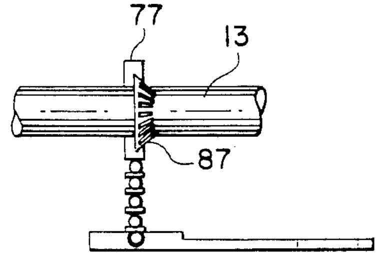
FIG. 7 is a side view of the tube support platform of FIG. 5 with a neon tube supported thereby.

A plurality of thin sectors 83 are resiliently secured to the jaws 77 extending toward the center of the "U" configuration for providing a deflected resilient interference with the tubing as the same enters between the gripper jaws. The sectors 83 flare to the sides of the tube for buoying the same in a shock absorbing attitude. FIG. 7 shows a side view of an embodiment utilizing a plurality of tines 87 for resiliently supporting the tube 13 between the gripper jaws 77.

The camming surfaces 81, gripper jaws 77 and the sectors 83 serve to receive different sizes of tubes. The tubes may be quickly snapped into the gripper 71 without need of adjustment for size.

Figure 5:
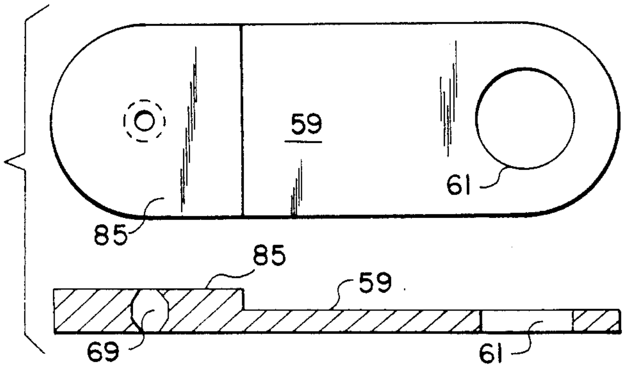
FIG. 5 is a cross sectional side view and top view of a tube support platform of the block sign letter according to the present invention.
Figure 8:
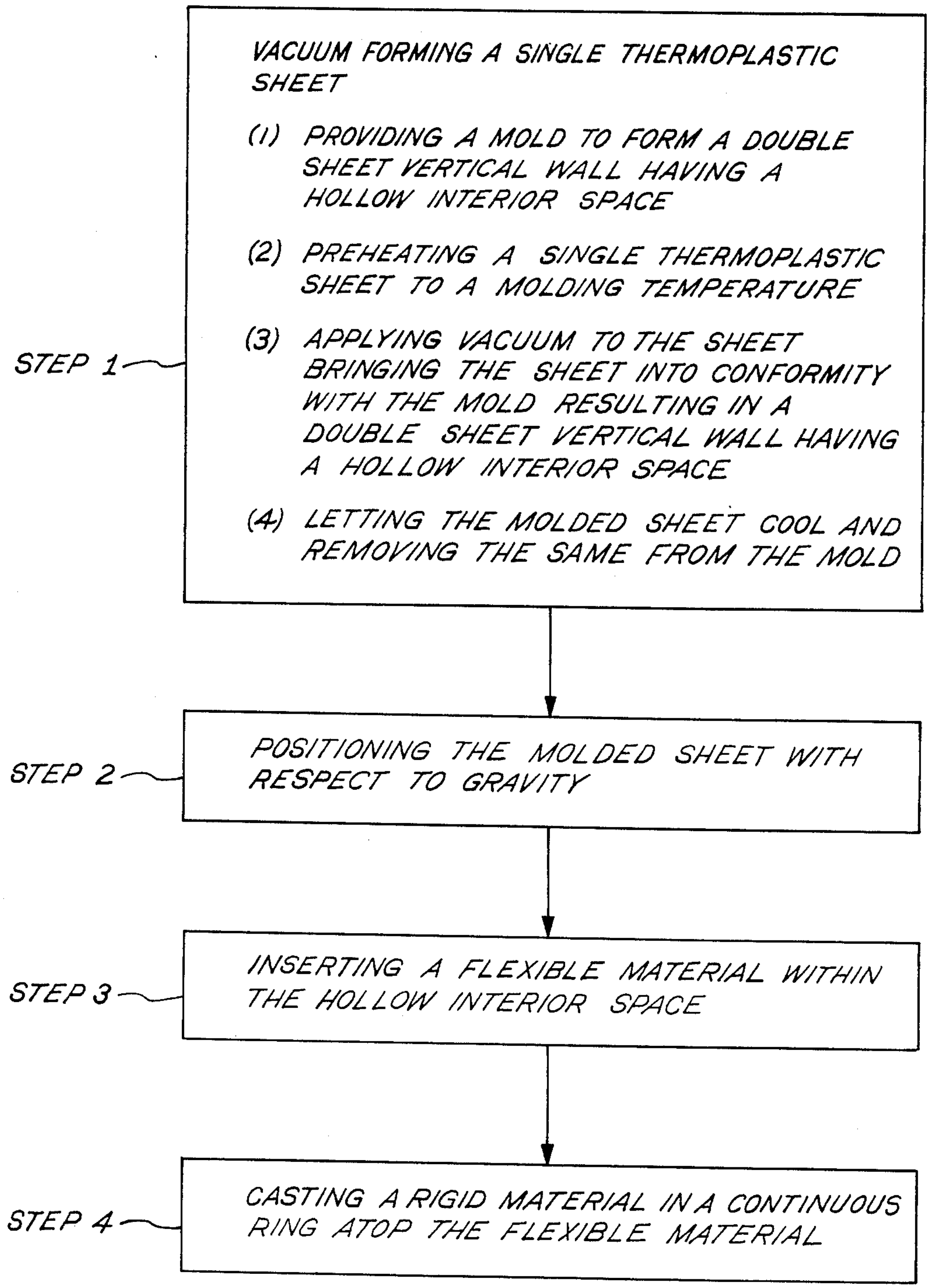
FIG. 8 is a flow diagram of the method of making the sign letter of FIG. 1.

Referring to FIG. 5, the support platform 59 includes a raised portion 85 surrounding the area of the stand support opening 69. The raised portion 85 provides twice the thickness than the remainder of the platform for accomodating an adequate thickness of which to form the socket opening 69. The raised portion 85 extends from the opening a sufficient distance to serve as a stop abutment for retarding one support platform from moving too close to another where two platforms are mounted to the same standard. The platform may also be inverted before placement on the standard 15 to further adjust the height of the tubing above the platform by ½ a spheroid distance.

It should be understood, of course, that the foregoing disclosure relates to preferred embodiments of the invention and that other modifications or alterations may be made therein without departing from the spirit or scope of the invention as set forth in the appended claims.

What is claimed is:

1. A method of forming a sign display element from a sole unitary thin thermoplastic sheet comprising the steps of:

A. configuring the thermoplastic sheet including:
   1. providing a mold with configured mold surfaces which is adapted for thermoforming the thermoplastic sheet into the configuration of said sign display element having a base of a particular shape and a double sheet vertical wall circumscribing the outer perimeter of said base with the two sheets of the wall being spaced apart to form a hollow interior space within the wall;
   2. preheating a thin thermoplastic sheet;
   3. thermoforming the thermoplastic sheet over the mold with the application of a vacuum to the thermoplastic sheet to aid in causing the sheet to be conformed to the mold; and
   4. cooling and removing the molded sheet from the mold; and B. rigidfying the molded sheet including:
   1. positioning the vacuum formed sheet having the hollow interior space opening upwardly to form a mold form for performing the following steps;
   2. introducing supporting material into the bottom of the said hollow interior space of the vacuum molded sheet in contact with the two sheets of the wall;
   3. pouring a curable resin material inside said hollow interior space on the top surface of said supporting material to a predetermined depth; and
   4. curing said resin to a rigid material connecting the two sheets of the wall to form the sign display element.

2. A method of forming a sign display element according to claim 1 wherein said supporting material is a flexible foam.

* * * * *